United States Patent
Liu et al.

(10) Patent No.: US 12,346,230 B2
(45) Date of Patent: Jul. 1, 2025

(54) TEST METHOD AND MULTI-PROCESSOR SOC CHIP

(71) Applicant: INSPUR SUZHOU INTELLIGENT TECHNOLOGY CO., LTD., Suzhou (CN)

(72) Inventors: Wentao Liu, Suzhou (CN); Ruizhen Wu, Suzhou (CN); Xinwu Shen, Suzhou (CN); Hui Zhang, Suzhou (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 131 days.

(21) Appl. No.: 18/259,675

(22) PCT Filed: Dec. 30, 2021

(86) PCT No.: PCT/CN2021/143261
§ 371 (c)(1),
(2) Date: Jun. 28, 2023

(87) PCT Pub. No.: WO2022/148298
PCT Pub. Date: Jul. 14, 2022

(65) Prior Publication Data
US 2024/0054059 A1    Feb. 15, 2024

(30) Foreign Application Priority Data
Jan. 7, 2021 (CN) .......................... 202110018480.4

(51) Int. Cl.
*G06F 11/273* (2006.01)
*G06F 9/48* (2006.01)

(52) U.S. Cl.
CPC .......... *G06F 11/273* (2013.01); *G06F 9/4818* (2013.01)

(58) Field of Classification Search
CPC ............................ G06F 11/273; G06F 9/4818
See application file for complete search history.

(56) References Cited

U.S. PATENT DOCUMENTS

| | | | | |
|---|---|---|---|---|
| 7,559,001 B2 * | 7/2009 | Betawar | ................ | G06F 11/263 717/124 |
| 2007/0220456 A1 * | 9/2007 | Duan | ............... | G01R 31/31723 716/136 |

(Continued)

FOREIGN PATENT DOCUMENTS

| | | |
|---|---|---|
| CN | 103235715 A | 8/2013 |
| CN | 104346247 A | 2/2015 |

(Continued)

OTHER PUBLICATIONS

International Search report for PCT/CN2021/143261 mailed on Mar. 16, 2022.

(Continued)

*Primary Examiner* — Jigar P Patel
(74) *Attorney, Agent, or Firm* — Dennemeyer & Associates LLC

(57) ABSTRACT

A test method and a multi-processor SOC chip are provided. The method includes: parsing a first command line in a host system input buffer by a host system to obtain a first command and a first parameter corresponding to the first command line, when the first command is a command of the host system in a host system command set, executing the first command by the host system, and when the first command is a command corresponding to a subsystem, sending, by the host system, the first parameter to a subsystem input buffer corresponding to the subsystem as a second command line; and parsing the second command line by a subsystem to obtain a second command and a second parameter corresponding to the second command line, and (Continued)

when the second command is a command in a subsystem command set of the subsystem, executing the second command by the subsystem.

18 Claims, 7 Drawing Sheets

(56) References Cited

U.S. PATENT DOCUMENTS

| | | | |
|---|---|---|---|
| 2011/0131375 A1* | 6/2011 | Noeldner | G06F 13/28 |
| | | | 711/E12.001 |
| 2019/0272217 A1 | 9/2019 | Lee et al. | |
| 2021/0026711 A1* | 1/2021 | Ovadia | H04L 69/16 |
| 2022/0100856 A1* | 3/2022 | Wise | G06F 21/567 |

FOREIGN PATENT DOCUMENTS

| | | |
|---|---|---|
| CN | 105389235 A | 3/2016 |
| CN | 106933760 A | 7/2017 |
| CN | 110018935 A | 7/2019 |
| CN | 112732501 A | 4/2021 |

OTHER PUBLICATIONS

Search report 1 for Chinese application 202110018480.4, filed Jan. 7, 2021.

Search report 2 for Chinese application 202110018480.4, filed Jan. 7, 2021.

* cited by examiner

Fig. 1

Parse a first command line in a host system input buffer by a host system to obtain a first command and a first parameter corresponding to the first command line, when the first command is a command of the host system in a host system command set, execute the first command by the host system, and when the first command is a command corresponding to a subsystem, send, by the host system, the first parameter to a subsystem input buffer corresponding to the subsystem as a second command line ⟵ S11

Parse the second command line by a subsystem to obtain a second command and a second parameter corresponding to the second command line, and when the second command is a command in a subsystem command set of the subsystem, execute the second command by the subsystem ⟵ S12

Input buffer

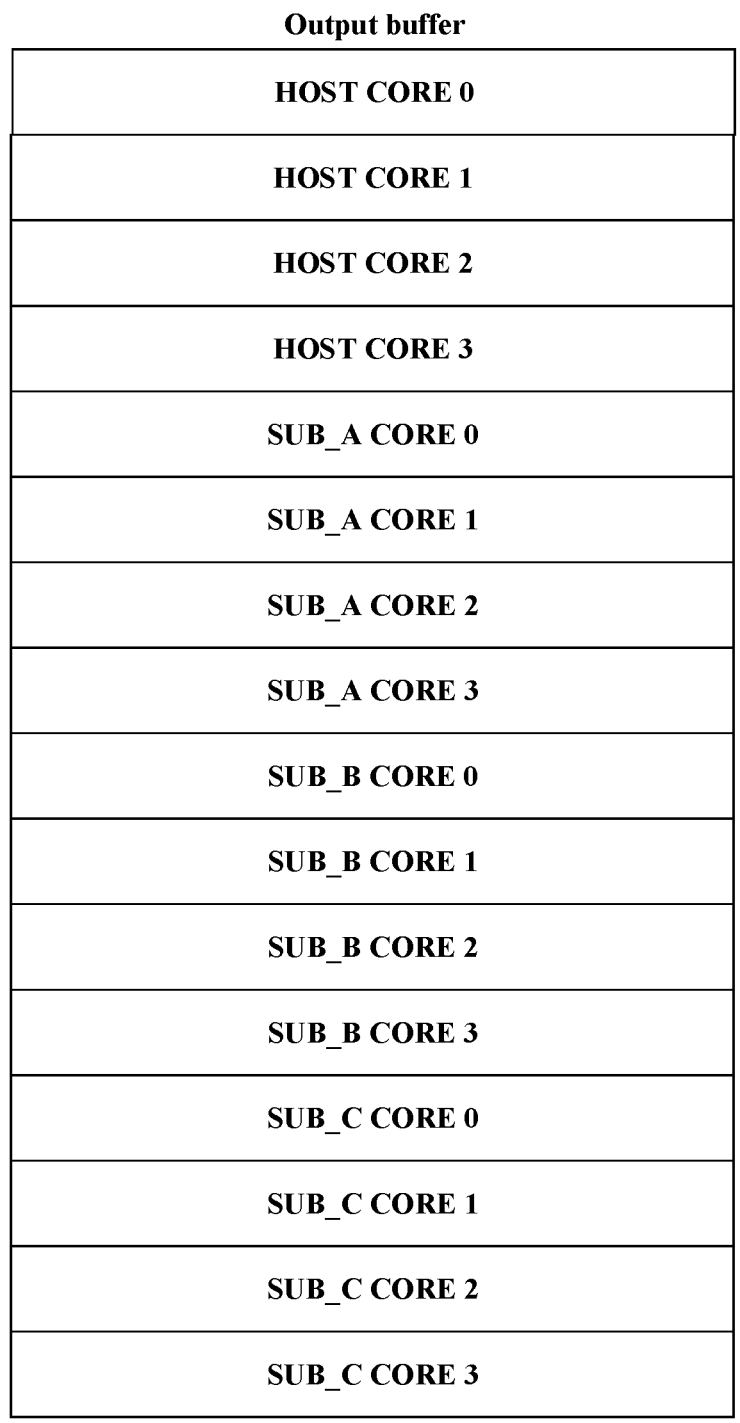

TEST METHOD AND MULTI-PROCESSOR SOC CHIP

CROSS-REFERENCE TO RELATED APPLICATIONS

This is a 35 U.S.C. 371 National Stage Patent Application of International Application No. PCT/CN2021/143261, filed Dec. 30, 2021, which claims priority to Chinese application 202110018480.4, filed Jan. 7, 2021, each of which is hereby incorporated by reference in its entirety.

TECHNICAL FIELD

The present disclosure relates to the technical field of System On Chip (SOC) chips, and in particular, to a test method and a multi-processor SOC chip.

BACKGROUND

With the high-speed development of chip technologies, the complexity of chips becomes higher and higher, and functions, which may only be implemented by several chips together, may now be implemented on a single chip, such that in more and more SOC chips, the number of Central Processing Units (CPUs) are increased from previous one to several at present, and even dozens or more. The architecture of such a multi-processor SOC chip is generally composed of a host system including a host CPU and a plurality of other subsystems including sub-CPUs. Generally, since functions to be implemented by the host system and each subsystem are different, the requirements for the performance of the CPUs are also different, so that the architectures of the host CPU and the plurality of sub-CPUs are also different in terms of the model selection of CPU Intellectual Properties (IPs) (CPU IP is a segment of hardware description language program used for implementing an exemplary circuit function). These CPU IPs include various series of CPU IPs released by different CPU IP manufacturers, for example, ARM, Cadence, Synopsys, and other CPU IP manufacturers. The CPU IP manufacturers also provide different assorted Integrated Development Environments (IDE) for their CPUs.

During a chip development process, test is an extremely important link which ensures the correctness of chip design. Test tasks of such multi-processor SOC chips are generally divided according to the systems, and different testers are responsible for testing the host system and other subsystems. Since the CPU architectures of the systems are different, in general, the test case development environments used for the systems are also different, and are generally based on the IDEs provided by the CPU IP manufacturers. Different testers develop test cases in different development environments, so that there is a great possibility to cause the development of the entire SOC chip test case to lose uniformity and consistency, which finally results in test vulnerabilities and low test efficiency.

SUMMARY

In view of the above, the embodiments of the present disclosure provide a test method and a multi-processor SOC chip, which may ensure uniformity and consistency of testing the multi-processor SOC chip, thereby improving test efficiency and reducing the occurrence rate of test vulnerabilities. The specific solution is described as follows.

In a first aspect, the embodiments of the present disclosure provide a test method, which is applied to a multi-processor SOC chip, wherein the multi-processor SOC chip includes a host system and at least one subsystem, and the method includes:

parsing a first command line in a host system input buffer by the host system to obtain a first command and a first parameter corresponding to the first command line, when the first command is a command of the host system in a host system command set, executing the first command by the host system, and when the first command is a command corresponding to a subsystem, sending, by the host system, the first parameter to a subsystem input buffer corresponding to the subsystem as a second command line; and parsing the second command line by the subsystem to obtain a second command and a second parameter corresponding to the second command line, and when the second command is a command in a subsystem command set of the subsystem, executing the second command by the subsystem.

In some exemplary embodiments, the method further includes:

after executing the first command by the host system, writing corresponding first output information into a corresponding host system output buffer by the host system;

triggering a corresponding first interrupt signal by an interrupt trigger module of the host system, so as to call an interrupt service program corresponding to the first interrupt signal to process the first output information;

after executing the second command by the subsystem, writing corresponding second output information into a corresponding subsystem output buffer by the subsystem; and triggering, by an interrupt trigger module of the subsystem, a second interrupt signal corresponding to the subsystem in the host system, so that the host system calls an interrupt service program corresponding to the second interrupt signal to process the second output information.

In some exemplary embodiments, the method further includes:

calling a corresponding interrupt service program according to a priority of the interrupt signal, so as to process the corresponding output information.

In some exemplary embodiments, before writing the corresponding second output information into the corresponding subsystem output buffer, the method further includes:

monitoring, by the subsystem, whether the corresponding subsystem output buffer is currently in an idle state, and when the corresponding subsystem output buffer is currently in the idle state, writing the second output information into the corresponding subsystem output buffer.

In some exemplary embodiments, calling the interrupt service program corresponding to the second interrupt signal to process the second output information includes:

calling the interrupt service program corresponding to the second interrupt signal to display the second output information on a terminal display interface.

In some exemplary embodiments, the method further includes:

respectively allocating, in advance in a shared memory, the host system input buffer, the subsystem input buffer, the host system output buffer and the subsystem output buffer to the host system and the subsystem.

In some exemplary embodiments, the method further includes:

when the first command is not a command of the host system in the host system command set and is not a command corresponding to the subsystem, clearing the host system input buffer; and when the second command is not a command in the subsystem command set, clearing the subsystem input buffer.

In a second aspect, the embodiments of the present disclosure provide a multi-processor SOC chip, the multi-processor SOC chip includes a host system and at least one subsystem, wherein the host system is configured to parse a first command line in a host system input buffer to obtain a first command and a first parameter corresponding to the first command line, when the first command is a command of the host system in a host system command set, execute the first command, and when the first command is a command corresponding to a subsystem, send the first parameter to a subsystem input buffer corresponding to the subsystem as a second command line; and the subsystem is configured to parse the second command line to obtain a second command and a second parameter corresponding to the second command line, and when the second command is a command in a subsystem command set of the subsystem, execute the second command.

In some exemplary embodiments, the host system is further configured to, after executing the first command, write corresponding first output information into a corresponding host system output buffer, and trigger a corresponding first interrupt signal by an interrupt trigger module of the host system, so as to call an interrupt service program corresponding to the first interrupt signal to process the first output information; and the subsystem is further configured to, after executing the second command, write corresponding second output information into a corresponding subsystem output buffer, and trigger, by an interrupt trigger module of the subsystem, a second interrupt signal corresponding to the subsystem in the host system, so that the host system calls an interrupt service program corresponding to the second interrupt signal to process the second output information.

In some exemplary embodiments, the multi-processor SOC chip further includes:

a shared memory, configured to allocate the host system input buffer, the subsystem input buffer, the host system output buffer and the subsystem output buffer to the host system and the subsystem.

It can be seen that in the embodiments of the present disclosure, the host system parses the first command line in the host system input buffer, so as to obtain the first command and the first parameter corresponding to the first command line, when the first command is the command of the host system in the host system command set, the host system executes the first command, and when the first command is the command corresponding to the subsystem, the host system sends the first parameter to the subsystem input buffer corresponding to the subsystem as the second command line; and the subsystem parses the second command line, so as to obtain the second command and the second parameter corresponding to the second command line, and when the second command is the command in the subsystem command set of the subsystem, the subsystem executes the second command That is, in the embodiments of the present disclosure, the command processing modes of the host system and the subsystem are unified, thereby reducing the difference of the systems in processing the commands. In this way, uniformity and consistency of testing the multi-processor SOC chip may be ensured, thereby improving the test efficiency and reducing the occurrence rate of test vulnerabilities

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the following description are merely embodiments of the present disclosure, and for those having ordinary skill in the art, other drawings may also be obtained according to the provided drawings without any creative effort.

FIG. 1 is a flowchart of a test method according to the embodiments of the present disclosure;

FIG. 5b is an exemplary schematic diagram of output buffer allocation according to the embodiments of the present disclosure;

DETAILED DESCRIPTION

Figure 2:
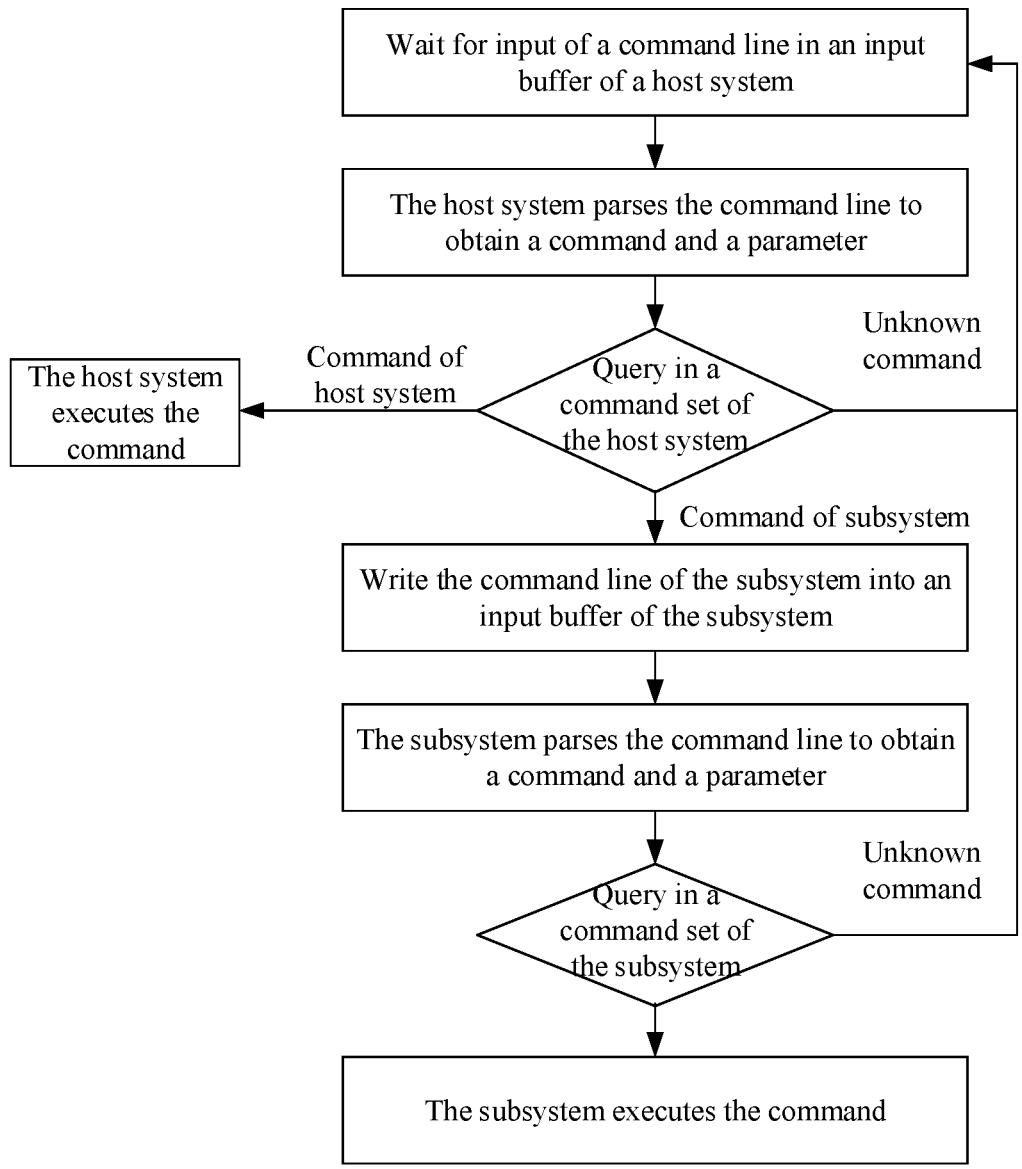
FIG. 2 is an exemplary command execution flowchart according to the embodiments of the present disclosure.

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those having ordinary skill in the art based on the embodiments of the present disclosure without any creative effort, fall into the protection scope of the present disclosure.

During a chip development process, test is an extremely important link which ensures the correctness of chip design. Test tasks of such multi-processor SOC chips are generally divided according to the systems, and different testers are responsible for testing the host system and other subsystems. Since the CPU architectures of the systems are different, in general, the test case development environments used for the systems are also different, and are generally based on the IDEs provided by the CPU IP manufacturers. Different testers develop test cases in different development environments, so that there is a great possibility to cause the development of the entire SOC chip test case to lose uniformity and consistency, which finally results in test vulnerabilities and low test efficiency. To this end, the embodiments of the present disclosure provide a test solution for an SOC chip, which may ensure uniformity and consistency of testing the multi-processor SOC chips, thereby improving test efficiency and reducing the occurrence rate of test vulnerabilities Referring to FIG. 1, the embodiments of the present disclosure provide a test method, which is applied to a multi-processor SOC chip, wherein the multi-processor SOC chip includes a host system and at least one subsystem. The method includes the following operations S11 and S12.

At S11: the host system parses a first command line in a host system input buffer to obtain a first command and a first parameter corresponding to the first command line, when the first command is a command of the host system in a host system command set, the host system executes the first command, and when the first command is a command corresponding to a subsystem, the host system sends the first parameter to a subsystem input buffer corresponding to the subsystem as a second command line.

In an exemplary embodiment, a command of each subsystem may be named based on a name of the subsystem, for example, sub_a, sub_b or sub_c, and the command is added into the host system command set. When the host system parses the command and determines that the name of the command is sub_a, sub_b or sub_c, the host system distributes the parameter after the name of the command to the subsystem as a command of the subsystem so that the subsystem may execute the command of the subsystem.

Moreover, when the first command is not a command of the host system in the host system command set and is not a command corresponding to the subsystem, the host system input buffer is cleared.

In some exemplary implementations, when the host system input buffer of the host system receives an input first command line, the first command line is parsed by a preset command parsing function to obtain a first command and a first parameter corresponding to the first command line, the host system queries the first command in the host system command set, when the first command is not found in the host system command set, the host system clears the host system input buffer and waits for input of a next command line; when the first command is found and the first command is not a command named based on the name of a subsystem, the host system executes the first command, clears the host system input buffer after executing the first command and waits for input of a next command line; and when the first command is a command named based on the name of a subsystem, the host system sends the first parameter to the subsystem input buffer corresponding to the subsystem as the second command line.

At S12: the subsystem parses the second command line to obtain a second command and a second parameter corresponding to the second command line, and when the second command is a command in a subsystem command set of the subsystem, the subsystem executes the second command.

In an exemplary embodiment, when the second command is not a command in the subsystem command set, the subsystem input buffer is cleared.

For example, referring to FIG. 2, FIG. 2 is an exemplary command execution flowchart according to the embodiments of the present disclosure. The input of the command is implemented by using the input buffers of the host system and each subsystem. A set of command processing mechanism is implemented in the host system, and based on the command processing mechanism, the command of the host system is executed and the command of each subsystem is distributed to each subsystem for execution. Meanwhile, a set of command processing mechanism is implemented in each subsystem for executing the command of the subsystem, which is distributed from the host system. In the host system command set, in order to distribute the command of each subsystem, a naming mode in which the name of the subsystem is used as the name of the command is established. When the input buffer of the host system receives an input command line, the command line is parsed by a command parsing function to obtain a command and a parameter represented by the command line, the command is queried in the command set of the host system, when the command is not found, the command is an unknown command, and the host system clears the input buffer and waits for the input of the next command line; and when the command is found and the command is not a command named by the name of the subsystem, the host system executes the command, and after the command is executed, clears the input buffer and waits for the input of the next command line. When the command is found and the command is a command named by the name of the subsystem, the host system sends the parameter after the command to the input buffer of the corresponding subsystem as the command line of the subsystem, and the command parsing process of the subsystem is consistent with the command parsing process of the host system, the subsystem parses the command line by the command parsing function, so as to obtain a command and a parameter represented by the command line, the subsystem queries the command in the command set of the subsystem, when the command is not found, the command is an unknown command, and the subsystem clears the input buffer and waits for the input of the next command line; and when the command is found, the subsystem executes the command, and after executing the command, the subsystem clears the input buffer and waits for the input of the next command line.

That is, in the embodiments of the present disclosure, the command processing mechanisms of the host system and each subsystem may be established, that is, which commands are supported by the host system, which commands are supported by each subsystem, and how each subsystem processes these commands are specified. A command list of the host system is established in the host system, and a respective command list is established in each subsystem. In addition, functions corresponding to operations to be implemented by these commands are created, and a call relationship is established between the commands and the functions. When a certain command is input, the system queries the command list according to the input command, and calls a corresponding function to complete the command. These command sets and the functions to be implemented by the commands are determined based on the test requirements of the multi-processor SOC chip.

It can be seen that in the embodiments of the present disclosure, the host system parses the first command line in the host system input buffer, so as to obtain the first command and the first parameter corresponding to the first command line, when the first command is the command of the host system in the host system command set, the host system executes the first command, and when the first command is the command corresponding to the subsystem, the host system sends the first parameter to the subsystem input buffer corresponding to the subsystem as the second command line; and the subsystem parses the second command line, so as to obtain the second command and the second parameter corresponding to the second command line, and when the second command is the command in the subsystem command set of the subsystem, the subsystem executes the second command That is, in the embodiments of the present disclosure, the command processing modes of the host system and the subsystem are unified, thereby reducing the difference of the systems in processing the commands. In this way, uniformity and consistency of testing the multi-processor SOC chip may be ensured, thereby improving the test efficiency and reducing the occurrence rate of test vulnerabilities.

Figure 3:
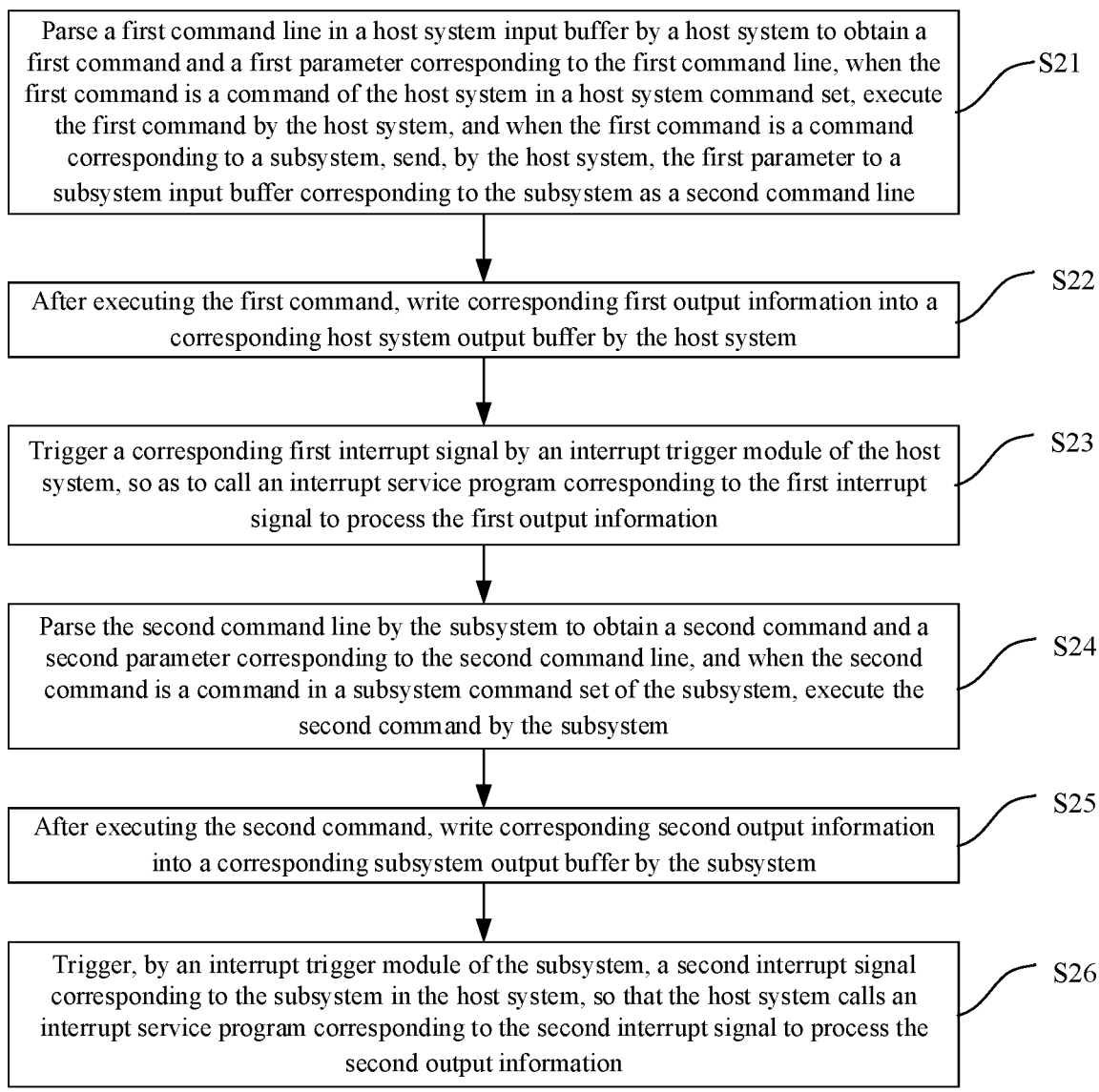
FIG. 3 is an exemplary flowchart of a test method according to the embodiments of the present disclosure.

Referring to FIG. 3, the embodiments of the present disclosure provide an exemplary test method, which is applied to a multi-processor SOC chip, wherein the multi-processor SOC chip includes a host system and at least one subsystem, and the method includes the following operations S21 to S26.

At S21: the host system parses a first command line in a host system input cache to obtain a first command and a first parameter corresponding to the first command line, when the first command is a command of the host system in a host system command set, the host system executes the first command, and when the first command is a command corresponding to a subsystem, the host system sends the first parameter to a subsystem input buffer corresponding to the subsystem as a second command line.

At S22: after executing the first command, the host system writes corresponding first output information into a corresponding host system output buffer.

In an exemplary implementation of the present embodiment, the host system may monitor whether the corresponding host system output buffer is currently in an idle state, and when the corresponding host system output buffer is currently in the idle state, the host system writes the first output information into the corresponding host system output buffer.

At S23: an interrupt trigger module of the host system triggers a corresponding first interrupt signal, so as to call an interrupt service program corresponding to the first interrupt signal to process the first output information.

In an exemplary embodiment, the interrupt service program corresponding to the first interrupt signal may be called, so as to display the first output information on a terminal display interface.

At S24: the subsystem parses the second command line to obtain a second command and a second parameter corresponding to the second command line, and when the second command is a command in a subsystem command set of the subsystem, the subsystem executes the second command.

At S25: after executing the second command, the subsystem writes corresponding second output information into a corresponding subsystem output buffer.

In an exemplary embodiment, the subsystem may monitor whether the corresponding subsystem output buffer is currently in an idle state, and when the corresponding subsystem output buffer is currently in the idle state, the subsystem writes the second output information into the corresponding subsystem output buffer.

At S26: an interrupt trigger module of the subsystem triggers a second interrupt signal corresponding to the subsystem in the host system, so that the host system calls an interrupt service program corresponding to the second interrupt signal to process the second output information.

In an exemplary embodiment, the interrupt service program corresponding to the second interrupt signal may be called, so as to display the second output information on the terminal display interface.

Further, in the present embodiment, the corresponding interrupt service program may be called according to a priority of the interrupt signal, so as to process the corresponding output information.

That is, in the embodiments of the present disclosure, an interrupt resource, that is, ICC (i.e., Inter Chip Communication) interrupt signal, allocated in an interrupt system of the host system to the subsystem in the multi-processor SOC chip may be determined. In the present embodiment, an ICC interrupt number (signal) in the interrupt system of the host system may be allocated to each subsystem, and in some alternative embodiments, a plurality of ICC interrupt numbers (signals) in the interrupt system of the host system may be allocated to each subsystem. Moreover, for the host system and each subsystem, when the information output of each system needs to be handled according to a priority requirement, a corresponding priority level may be configured for the interrupt number (signal) of each subsystem in the interrupt module of the host system, so as to achieve the information output according to priorities corresponding to respective subsystems.

In an exemplary embodiment, it is possible to respectively allocate, in advance in a shared memory, the host system input buffer, the subsystem input buffer, the host system output buffer and the subsystem output buffer to the host system and the subsystem.

Moreover, the host system input buffer, the subsystem input buffer, the host system output buffer and the subsystem output buffer may be allocated based on a continuous spatial address. In this way, buffer allocation may be implemented by using only one base address, and address adjustment is convenient.

In the present embodiment, a corresponding output buffer may be allocated to each CPU core in the host system and the subsystem, and the core of the CPU in each system is used as the unit of the output of each piece of system information, and on any core, the execution information and result information of the command are written into the output buffer corresponding to the core by the system where the core is located.

Figure 4:
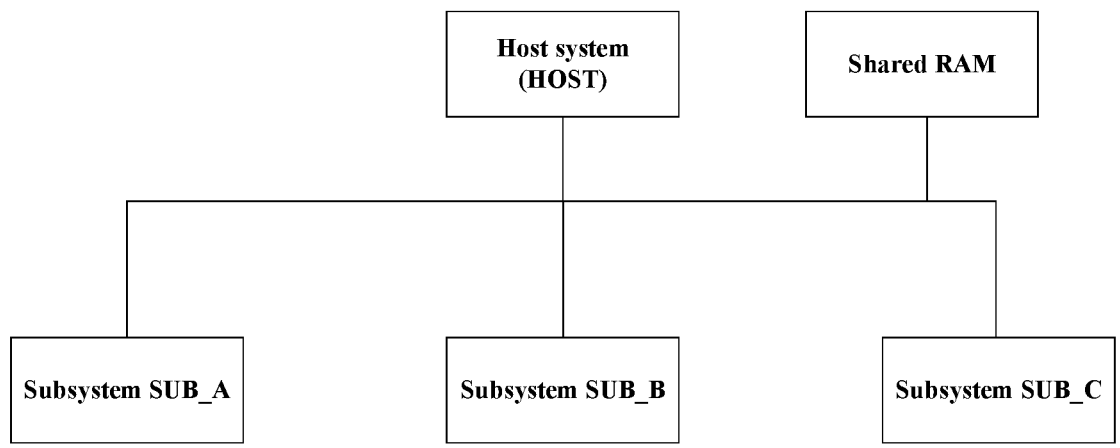
FIG. 4 is an exemplary architecture diagram of a multi-processor SOC chip according to the embodiments of the present disclosure.

For example, referring to FIG. 4, FIG. 4 is an exemplary architecture diagram of a multi-processor SOC chip according to the embodiments of the present disclosure. The processors of the host system (HOST) and sub-systems (SUB_A, SUB_B and SUB_C) all have a 4-core CPU. A shared RAM (i.e., Random Access Memory) may be accessed by the host system and all subsystems at the same time, and is mainly used for the communication among the systems. In the present embodiment, the host system (HOST) and sub-systems (SUB_A, SUB_B and SUB_C) may utilize the shared RAM to implement the input buffer and output buffer of each system. For the input buffer, the host system and each subsystem are respectively allocated with an RAM space, the input buffer of each system is used for receiving an input command line, and the command line does not exceed several hundreds of bytes in general, so that the size allocated to the input buffer is generally several hundreds of bytes. For the output buffer, each system has a 4-core CPU, so that an RAM space is allocated to each core of the CPU in each system, the output buffer of each system is used for storing the output information of each core of the CPU of the present system, the size of the output buffer is generally a few hundred bytes to a few K bytes, and the size is jointly determined according to the actual size of the shared RAM and the actual demand. It should be noted that in the multi-processor SOC chip, the host system and each subsystem may use a memory management mode of their respective system alone, and for the data interaction between the systems, it is necessary to consider the memory cache consistency problem between the systems, therefore the RAM address space is shared, and a non-cacheable mode needs to be configured in each system, so as to ensure the consistency of the data between the systems, and ensure the correctness of the interaction data of each system.

Figure 5A:
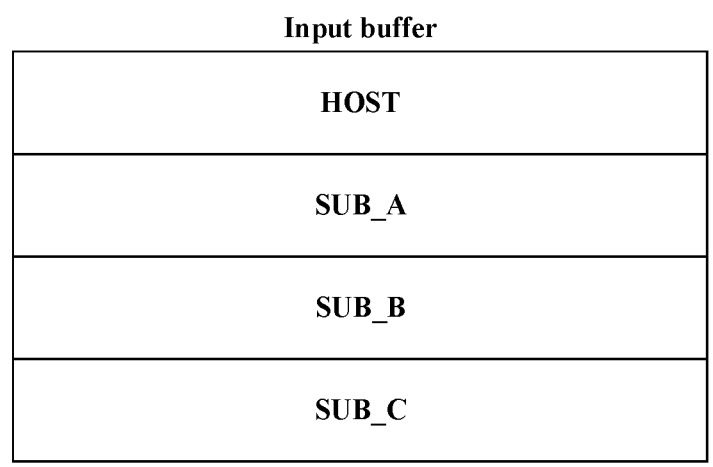
FIG. 5a is an exemplary schematic diagram of input buffer allocation according to the embodiments of the present disclosure.

For example, referring to FIG. 5a, FIG. 5a is an exemplary schematic diagram of input buffer allocation according to the embodiments of the present disclosure. Referring to FIG. 5b, FIG. 5b is an exemplary schematic diagram of input buffer allocation according to the embodiments of the present disclosure. FIG. 5a and FIG. 5b show allocation of the input buffer and output buffer of each system in the shared RAM. In an exemplary embodiment, the input buffer and output buffer of each system may be allocated in a continuous address space in the shared RAM, so that the address space position of the input buffer and output buffer of each system in the shared RAM may be conveniently adjusted in actual use.

Figure 6:
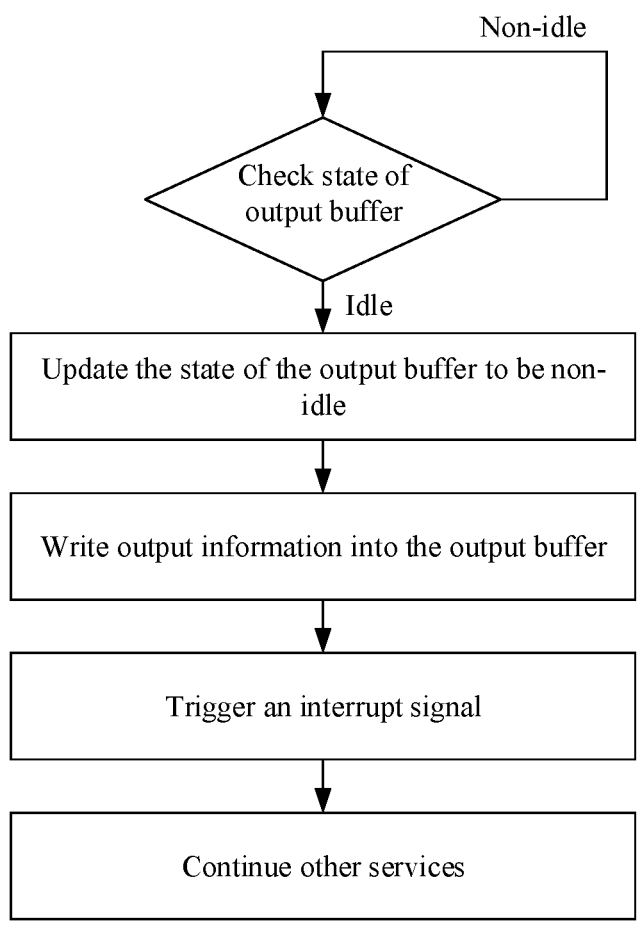
FIG. 6 is an exemplary operating flowchart of an information output system according to the embodiments of the present disclosure.
Figure 7:
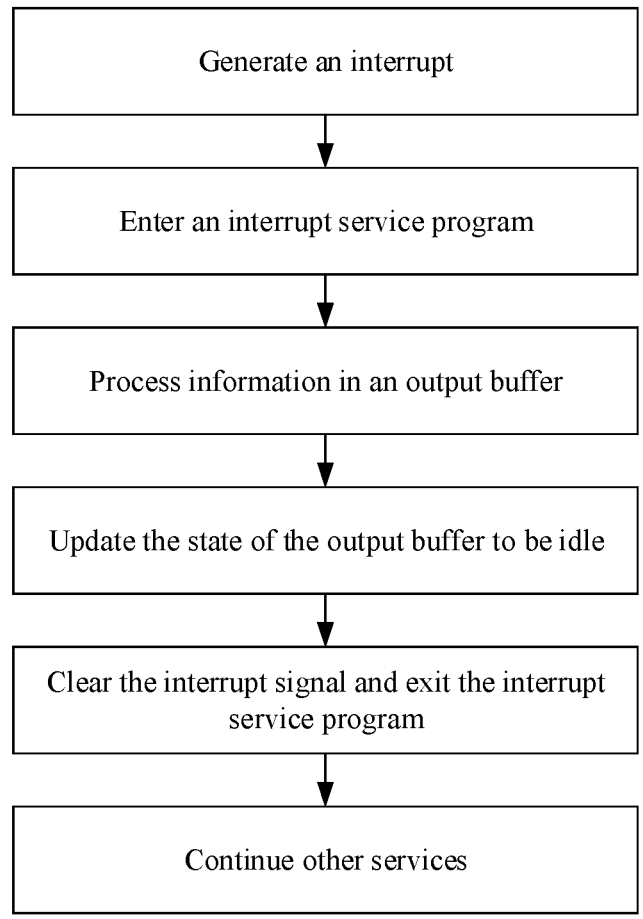
FIG. 7 is an exemplary flowchart of interrupt processing of a host system according to the embodiments of the present disclosure.

For example, referring to FIG. 6, FIG. 6 is an exemplary operating flowchart of an information output system according to the embodiments of the present disclosure, and referring to FIG. 7, FIG. 7 is an exemplary flowchart of interrupt processing of a host system according to the embodiments of the present disclosure. During a command execution process and after the execution of the command, the host system and each subsystem needs to output information related to command execution and final result information, and these pieces of information are respectively written into the output buffers of the host system and each subsystem by the host system and each subsystem, respectively. The core of the CPU in each system is used as the unit of the output of each piece of system information, that is, each core is allocated with one output buffer, and on this core, the execution information and the result information of the command are written into the output buffer corresponding to the core by the system where the core is located. The information of all output buffers is ultimately processed and output by the host system. In some exemplary implementations, the host system may call a printing function to print the information on a terminal, so as to present the information to a tester. When a certain core of the CPU in a certain system needs to output information, the system first checks whether the output buffer of the core is in an idle state, when the output buffer is in a non-idle state, the system waits for the information in the output buffer to be processed by the host system, when the output buffer is in an idle state, the system first updates the state of the output buffer to be non-idle, then writes the information that needs to be output into the output buffer, and operates an ICC module in the system to trigger an interrupt signal of the system in an interrupt system of the host system, and then the system continues to execute other services. The host system receives the interrupt signal and enters the interrupt service program corresponding to the interrupt signal, in the interrupt service program, the host system starts to process the information in the output buffer, calls the printing function, and outputs these pieces of information to a terminal display system of the host system. After completing the processing, the host system updates the state of the output buffer to be idle, finally clears the interrupt information and exits the interrupt service program, and then the host system continues to execute other services.

It should be noted that, in the embodiments of the present disclosure, an exclusive input buffer and an exclusive input buffer are allocated to the host system and each subsystem of the multi-processor SOC chip for the input of the command line and the output of information, thereby reducing the complexity of software development caused by the systems sharing one buffer. Moreover, the command processing modes of the host system and each subsystem in the multi-processor SOC chip test system are unified, so that the command input and information output of the host system and each subsystem are consistent, thereby reducing the difference of the systems in processing commands, enhancing the adhesion degree of each system in the development of test cases, improving the development efficiency of the test cases, and reducing the development complexity of the test cases. Further, an ICC interrupt resource of the multi-processor SOC chip is used for handling a processing request of an output message of each system in the host system without adding a hardware design of the chip to support this function.

In addition, the test method provided in the embodiments of the present disclosure is not limited to being applied to a multi-processor chip, and may also be applied to a circuit system including a plurality of processors.

Figure 8:
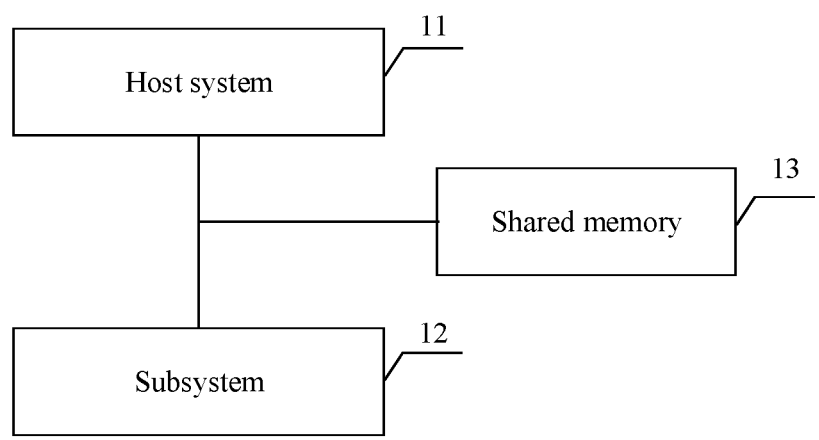
FIG. 8 is a schematic structural diagram of a multi-processor SOC chip according to the embodiments of the present disclosure.

Referring to FIG. 8, the embodiments of the present disclosure provide a multi-processor SOC chip. The multi-processor SOC chip includes a host system 11 and at least one subsystem 12, wherein
  the host system 11 is configured to parse a first command line in a host system input buffer to obtain a first command and a first parameter corresponding to the first command line, when the first command is a command of the host system in a host system command set, execute the first command, and when the first command is a command corresponding to a subsystem, send the first parameter to a subsystem input buffer corresponding to the subsystem as a second command line; and
  the subsystem 12 is configured to parse the second command line to obtain a second command and a second parameter corresponding to the second command line, and when the second command is a command in a subsystem command set of the subsystem, execute the second command.

It can be seen that in the embodiments of the present disclosure, the host system parses the first command line in the host system input buffer, so as to obtain the first command and the first parameter corresponding to the first command line, when the first command is the command of the host system in the host system command set, the host system executes the first command, and when the first command is the command corresponding to the subsystem, the host system sends the first parameter to the subsystem input buffer corresponding to the subsystem as the second command line; and the subsystem parses the second command line, so as to obtain the second command and the second parameter corresponding to the second command line, and when the second command is the command in the subsystem command set of the subsystem, the subsystem executes the second command That is, in the embodiments of the present disclosure, the command processing modes of the host system and the subsystem are unified, thereby reducing the difference of the systems in processing the commands. In this way, uniformity and consistency of testing the multi-processor SOC chip may be ensured, thereby improving the test efficiency and reducing the occurrence rate of test vulnerabilities.

The host system 11 is further configured to, after executing the first command, write corresponding first output information into a corresponding host system output buffer, and trigger a corresponding first interrupt signal by an interrupt trigger module of the host system, so as to call an interrupt service program corresponding to the first interrupt signal to process the first output information.

The subsystem 12 is further configured to, after executing the second command, write corresponding second output information into a corresponding subsystem output buffer, and trigger, by an interrupt trigger module of the subsystem, a second interrupt signal corresponding to the subsystem in the host system, so that the host system calls an interrupt service program corresponding to the second interrupt signal to process the second output information.

In an exemplary embodiment, the host system calls a corresponding interrupt service program according to a priority of the interrupt signal, so as to process the corresponding output information.

Moreover, the subsystem is configured to monitor whether the corresponding subsystem output buffer is currently in an idle state, and when the corresponding subsystem output buffer is currently in the idle state, write the second output information into a corresponding subsystem output buffer.

The host system is configured to call an interrupt service program corresponding to the second interrupt signal to display the second output information on a terminal display interface.

Moreover, the host system is further configured to clear the host system input buffer when the first command is not a command of the host system in the host system command set and is not a command corresponding to the subsystem.

The host system is further configured to clear the subsystem input buffer when the second command is not a command in the subsystem command set.

Further, the multi-processor SOC chip further includes:
a shared memory 13, configured to allocate the host system input buffer, the subsystem input buffer, the host system output buffer and the subsystem output buffer to the host system and the subsystem.

Various embodiments in the present specification are described in a progressive manner, each embodiment focuses on the difference from other embodiments, and the same or similar parts between the various embodiments may refer to each other. The operations of the method or algorithm described in combination with the embodiments disclosed herein may be implemented by directly using hardware, a software module executed by a processor, or a combination of the two. The software module may be placed in a random access memory (RAM), an internal memory, a read-only memory (ROM), an electrically programmable ROM, an electrically erasable programmable ROM, a register, a hard disk, a removable disk, a CD-ROM, or any other form of storage medium known in the art.

The test method and the multi-processor SOC chip provided in the embodiments of the present disclosure are described in detail above, and examples are used herein to describe the principles and embodiments of the present disclosure, and the description of the above embodiments is merely used to help understand the method of the embodiments of the present disclosure and the core idea thereof. At the same time, those having ordinary skill in the art may change exemplary embodiments and application ranges according to the idea of the present disclosure. In summary, the content of the present specification should not be construed as a limitation to the present disclosure.

What is claimed is:

1. A test method, which is applied to a multi-processor System On Chip (SOC) chip, wherein the multi-processor SOC chip comprises a host system and at least one subsystem, and the method comprises:
parsing a first command line in a host system input buffer by the host system to obtain a first command and a first parameter corresponding to the first command line, when the first command is a command of the host system in a host system command set, executing the first command by the host system, and when the first command is a command corresponding to a subsystem, sending, by the host system, the first parameter to a subsystem input buffer corresponding to the subsystem as a second command line; and
parsing the second command line by the subsystem to obtain a second command and a second parameter corresponding to the second command line, and when the second command is a command in a subsystem command set of the subsystem, executing the second command by the subsystem;
wherein the method further comprises:
after executing the first command by the host system, writing corresponding first output information into a corresponding host system output buffer by the host system;
triggering a corresponding first interrupt signal by an interrupt trigger module of the host system, so as to call an interrupt service program corresponding to the first interrupt signal to process the first output information;
after executing the second command by the subsystem, writing corresponding second output information into a corresponding subsystem output buffer by the subsystem; and
triggering, by an interrupt trigger module of the subsystem, a second interrupt signal corresponding to the subsystem in the host system, so that the host system calls an interrupt service program corresponding to the second interrupt signal to process the second output information.

2. The test method according to claim 1, further comprising:
calling a corresponding interrupt service program according to a priority of the interrupt signal, so as to process the corresponding output information.

3. The test method according to claim 1, wherein before writing the corresponding second output information into the corresponding subsystem output buffer, the method further comprises:
monitoring, by the subsystem, whether the corresponding subsystem output buffer is currently in an idle state, and when the corresponding subsystem output buffer is currently in the idle state, writing the second output information into the corresponding subsystem output buffer.

4. The test method according to claim 2, wherein calling the interrupt service program corresponding to the second interrupt signal to process the second output information comprises:
calling the interrupt service program corresponding to the second interrupt signal to display the second output information on a terminal display interface.

5. The test method according to claim 1, further comprising:

respectively allocating, in advance in a shared memory, the host system input buffer, the subsystem input buffer, the host system output buffer and the subsystem output buffer to the host system and the subsystem.

6. The test method according to claim 1, further comprising:
when the first command is not a command of the host system in the host system command set and is not a command corresponding to the subsystem, clearing the host system input buffer; and
when the second command is not a command in the subsystem command set, clearing the subsystem input buffer.

7. The test method according to claim 1, wherein the host system command set comprises commands of each subsystem and commands of the host system, wherein the commands of each subsystem are named based on a name of the subsystem.

8. The test method according to claim 7, wherein after parsing the first command line in the host system input buffer by the host system to obtain the first command and the first parameter corresponding to the first command line, further comprising:
querying, by the host system, the first command in the host system command set.

9. The test method according to claim 8, further comprising:
when the first command is not found in the host system command set, clearing, by the host system, the host system input buffer and waiting for input of a next command line.

10. The test method according to claim 8, further comprising:
when the first command is found and the first command is not a command named based on the name of the subsystem, determining that the first command is the command of the host system in the host system command set.

11. The test method according to claim 8, further comprising:
when the first command is found and the first command is a command named based on the name of the subsystem, determining that the first command is a command corresponding to the subsystem.

12. The test method according to claim 1, wherein the subsystem command set of the subsystem comprises commands of the subsystem.

13. The test method according to claim 12, wherein after parsing the second command line by the subsystem to obtain the second command and the second parameter corresponding to the second command line, the method further comprises:
querying, by the subsystem, the second command in the subsystem command set of the subsystem, when the second command is not found, clearing, by the subsystem, the subsystem input buffer and waits for input of a next command line.

14. The test method according to claim 1, wherein writing the corresponding first output information into the corresponding host system output buffer by the host system comprises:
monitoring whether the corresponding host system output buffer is currently in an idle state, and when the corresponding host system output buffer is currently in the idle state, writing, by the host system, the first output information into the corresponding host system output buffer.

15. The test method according to claim 5, wherein respectively allocating, in advance in the shared memory, the host system input buffer, the subsystem input buffer, the host system output buffer and the subsystem output buffer to the host system and the subsystem comprises:
respectively allocating, in advance in the shared memory, the host system input buffer, the subsystem input buffer, the host system output buffer and the subsystem output buffer based on a continuous spatial address.

16. A multi-processor System On Chip (SOC) chip, wherein the multi-processor SOC chip comprises a host system and at least one subsystem, wherein
the host system is configured to parse a first command line in a host system input buffer to obtain a first command and a first parameter corresponding to the first command line, when the first command is a command of the host system in a host system command set, execute the first command, and when the first command is a command corresponding to a subsystem, send the first parameter to a subsystem input buffer corresponding to the subsystem as a second command line; and
the subsystem is configured to parse the second command line to obtain a second command and a second parameter corresponding to the second command line, and when the second command is a command in a subsystem command set of the subsystem, execute the second command;
wherein the host system is further configured to, after executing the first command, write corresponding first output information into a corresponding host system output buffer, and trigger a corresponding first interrupt signal by an interrupt trigger module of the host system, so as to call an interrupt service program corresponding to the first interrupt signal to process the first output information; and
the subsystem is further configured to, after executing the second command, write corresponding second output information into a corresponding subsystem output buffer, and triggering, by an interrupt trigger module of the subsystem, a second interrupt signal corresponding to the subsystem in the host system, so that the host system calls an interrupt service program corresponding to the second interrupt signal to process the second output information.

17. The multi-processor SOC chip according to claim 16, further comprising:
a shared memory, configured to allocate the host system input buffer, the subsystem input buffer, the host system output buffer and the subsystem output buffer to the host system and the subsystem.

18. A non-transitory computer-readable storage medium storing a program, wherein the program, when executed by a multi-processor System On Chip (SOC) chip comprising a host system and at least one subsystem, causes the host system and the subsystem to implement following operations:
parsing a first command line in a host system input buffer by the host system to obtain a first command and a first parameter corresponding to the first command line, when the first command is a command of the host system in a host system command set, executing the first command by the host system, and when the first command is a command corresponding to a subsystem, sending, by the host system, the first parameter to a subsystem input buffer corresponding to the subsystem as a second command line; and parsing the second command line by the subsystem to obtain a second command and a second parameter corresponding to the second command line, and when the second command is a command in a subsystem command set of the subsystem, executing the second command by the subsystem:

after executing the first command, writing corresponding first output information into a corresponding host system output buffer by the host system, and triggering a corresponding first interrupt signal by an interrupt trigger module of the host system, so as to call an interrupt service program corresponding to the first interrupt signal to process the first output information, and after executing the second command, writing corresponding second output information into a corresponding subsystem output buffer by the subsystem, and triggering, by an interrupt trigger module of the subsystem, a second interrupt signal corresponding to the subsystem in the host system, so that the host system calls an interrupt service program corresponding to the second interrupt signal to process the second output information.

* * * * *